Dec. 18, 1956  CARL-ERIK GRANQVIST  2,774,966
RADIO BEACON

Filed Jan. 5, 1953  2 Sheets-Sheet 1

INVENTOR.
CARL-ERIK GRANQVIST
BY
Laurence B. Dodds
ATTORNEY

United States Patent Office 2,774,966
Patented Dec. 18, 1956

2,774,966
RADIO BEACON

Carl-Erik Granqvist, Lidingo, Sweden, assignor to Hazeltine Research, Inc., Chicago, Ill., a corporation of Illinois Application January 5, 1953, Serial No. 329,521

Claims priority, application Sweden February 23, 1952

10 Claims. (Cl. 343—106)

*General*

So-called speaking radio beacons possess advantages which offer good possibilities of their use in place of other kinds of direction indicating radio beacons, especially for air traffic. The advantages are, amongst others, that one may with a cheap and simple receiver on the airplane obtain an indication of the course which should be followed from the airplane to the place where the radio beacon is positioned. It is also possible to do this with good precision. Further, no complicated handling of the receiver is required by the personnel on the approaching airplane. The range of a normal speaking beacon is, at usual flying altitudes, from 150 to 200 kilometers, and the bearing accuracy is from 2 to 3 degrees. There are no especially high demands on the type of surroundings about the beacon because it is rather unimportant, if reflections, from the surroundings are created, since the lobe of the antenna direction characteristic of the radio transmitter, which is directed on to the receiver, is very narrow and is therefore influenced by adjacent topographical formations to but a very small extent.

An especially advantageous type of speaking radio beacon is described in applicant's copending application, Serial No. 219,139 filed April 4, 1951, now Patent No. 2,728,076 issued December 20, 1955. Therein it is stated that the directional characteristic which concerns the transmission of the speaking sound of a speaking radio beacon is provided on one side with so-called cigar-shaped lobes which may be used for transmission of the statement about the bearing. However, the directional characteristic unfortunately has more or less strong side lobes. For suppressing the erroneous indication from these side lobes one has provided for a separate field, a so-called covering field, the field characteristic of which is similar to a figure 8. This field is transmitted with such a direction action that the bearing indicating lobes will fall into the slip or gap between the two main lobes of the covering field. Therefore these main lobes in turn cover the side lobes. For producing the bearing indicating lobes together with the undesired side lobes a first antenna system is employed, and for producing the two lobes of the covering field a second antenna system is utilized.

Of course the covering field should have such intensity and a modulating signal of such intensity, that one may by this field effectively suppress every possibility of erroneous reception of a bearing by observing a side lobe instead of the main lobe of the bearing indicating field. Practical tests have proved that one can obtain a very good masking or blanketing by the covering field if it is modulated by a frequency in the order of magnitude of 1000 cycles per second, and as a matter of fact this covering field will be so good that one will only have to use about 30% modulation. However, it has been shown in practice, that a field of the frequency 1000 cycles per second will give a tone which is very tiring for the human ear and which has given rise to the psychological effect that the observer has become more or less inattentive due to the tiredness which the covering field tone in question has created in him. Further acoustic physiological investigations have, however, proved that the most suitable frequency on the audible wave of the covering field would be in the order of magnitude about 400 cycles per second since this frequency falls within the range for which the human ear is most trained. However a much higher intensity of the audio frequency tone is instead required and may necessitate a modulation depth of about 100%.

If now, in the receiver on the aircraft viewing this navigational information, the covering field would be observed during a time, corresponding to 170° rotation of the different field diagrams of the speaking beacon, a spoken sound thereafter being received during a turning angle of 10°, thereafter again the covering field being received during 170°, and finally a spoken sound being received during the remaining 10°, then obviously during the rotation of one turn the covering field will correspond to a total angle of 340°, whereas the spoken sound will only correspond to a total angle of 20° or ⅟₁₈ of the whole turn. The ear will therefore easily be accustomed to the higher sound intensity of the modulation wave of the covering field, and the so-called physiological volume control of the ear will then cause one to have great difficulty to receive the usually essentially weaker sound intensity of the bearing indicating speech. These circumstances have to a high degree diminished the usability of known speaking beacons.

It is an object of the invention therefore, to provide a new and improved radio beacon which avoids one or more of the above-mentioned disadvantages of prior such beacons.

The present invention refers to an arrangement for avoiding the above mentioned disadvantages. According to the invention arrangements are provided for transmitting the covering field with only periodical modulation so that the covering field is modulated, and consequently a tone is heard in the receiver only during the intervals when also the bearing indicating field is providing a statement about the bearing, whereas the covering field is nonmodulated or modulated to a smaller degree during the periods of time when the bearing indicating field does not carry any statement about the bearing.

In accordance with the invention, a radio beacon comprises a radiating system having a first radiation pattern of the shape of a sharply concentrated beam and a second radiation pattern of the general shape of a figure eight disposed with its axis normal to the axis of the aforesaid beam, and driving means coupled to the system for simultaneously rotating the aforesaid patterns. The radio beacon also includes a circuit for supplying a first carrier-frequency wave signal intermittently modulated by audio-frequency bearing information at predetermined angles of rotation of the first pattern, and a circuit for supplying a second carrier-frequency wave signal intermittently modulated by an audio-frequency signal coincident with the intermittent modulation of the first wave signal. The radio beacon further includes means coupled to the aforesaid circuits for applying the wave signals to the radiating system.

The invention is further described below in connection with a speaking beacon of the type disclosed in applicant's above-identified copending application but it is obvious that the invention is not limited to the use of such a speaking radio beacon since the invention may with the same advantage be used in any kind of speaking radio beacon. A similar radio beacon is disclosed in applicant's copending application Serial No. 329,522, filed January 5, 1953.

In the drawings Fig. 1 is a diagram useful in understanding the nature of the speaking radio beacon embodying the invention.

Figure 1:
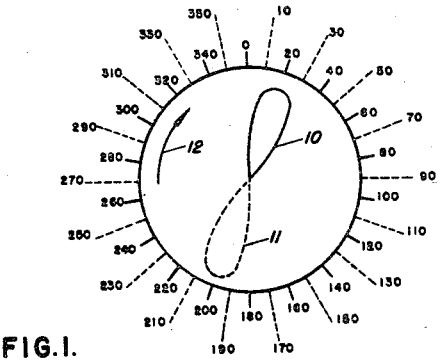

In Fig. 1 a bearing scale is indicated, in which the full lines indicate the spoken direct bearings, which are thus 0°, 20°, 40°, 60° and so on. The contra bearings are indicated with dotted lines, which are thus 10°, 30°, 50°, 70° and so on. Further, in the inner part of the bearing scale, the directional characteristic of the bearing indicating field of the radio beacon is drawn. This characteristic has the shape of a sharply concentrated beam and is reversible so that it may, for instance, when transmitting a direct bearing, have the form drawn by full lines and, when transmitting a contra bearing, have the form shown by dotted lines. The first mentioned characteristic is indicated by the reference numeral 10, and the latter one by the numeral 11. The arrow 12 indicates the rotational direction of the characteristics in space.

Figure 2:
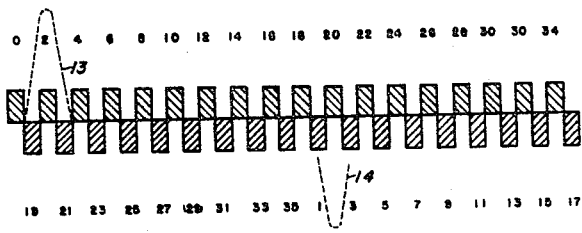
Fig. 2 represents a signal pattern for the bearing indications developed in the plane.

In Fig. 2 a response time diagram of the different bearing changes is shown. At the bearing 0 for a short interval the bearing indication "zero" is transmitted. In reality, however, the directional characteristic of course will pass in continuous movement from an angle on the minus side of the zero line to an angle on the plus side of the zero line during this indication, for instance from —5° to +5°. However, only about 1° or 2° of this angle is really used for the modulated part of the field, whereas the remaining space angle is non-modulated. During the rotation from 5° to 15° of bearing, the directional characteristic is reversed, and about in the middle of the movement through this angle the spoken bearing indication "nineteen" is transmitted, corresponding to a mean angle of 190° or an angular interval of 185° to 195°. Thereafter the direction characteristic is again reversed, so that it obtains its original direction in relation to the antenna, but meantime in mechanical or electrical way a rotation has been provided, so that the bearing indication "two" is now transmitted, indicating a mean angle of 20° and so on.

It is now seen that a receiver, placed in a bearing of 20° relative to the transmitter in the transmission path, above mentioned as the direct transmission, will hear the bearing indication "two", but after the directional characteristic has rotated substantially half a turn, one will in the same receiver hear first the bearing indication "one" and shortly thereafter the bearing indication "three." The intensity of these indications will be evident from the resonance curves 13 and 14, respectively, see Fig. 2, drawn at the bearings in question. One will see from these, that the bearing indication "two" will be heard with full intensity, whereas, however, the two adjacent contra bearings to the direct bearing 20, that means "one" and "three" will be heard more weakly.

Figure 3:
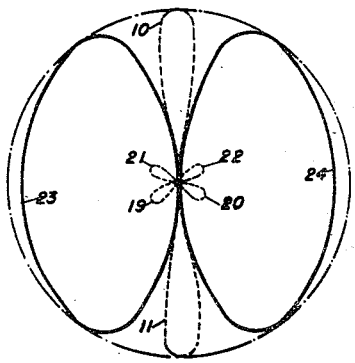
Fig. 3 represents the radiation pattern of an antenna used in an arrangement according to the invention.

In Fig. 3 the two bearing indicating lobes are indicated 10 and 11, but there are further four side lobes 19, 20, 21 and 22, the influence of which cannot be fully neglected. One has already proposed, in order to suppress disturbant transmission due to these side lobes, and simultaneously to give the beacon an identification indication, to provide the beacon with an extra antenna system of figure-eight like characteristic. The two lobes 23 and 24 in the last mentioned characteristic have their axes perpendicular to the axes of the lobes 10 and 11.

The bearing indicating field lobes 10 and 11 have thus the purpose of indicating the bearing, whereas the field lobes 23 and 24 serve to create a covering field. As mentioned above, this covering field will however, if acting continuously, give such a high sound intensity that the physiological sound control of the ear is set for a decreased audibility, and it may then easily occur that during the very short time when the lobe 10 or the lobe 11 is passing in the direction to the receiver, the receiving person will not grasp or recognize the sound transmitted by means of the field lobe 10 or 11, respectively.

Figure 4:
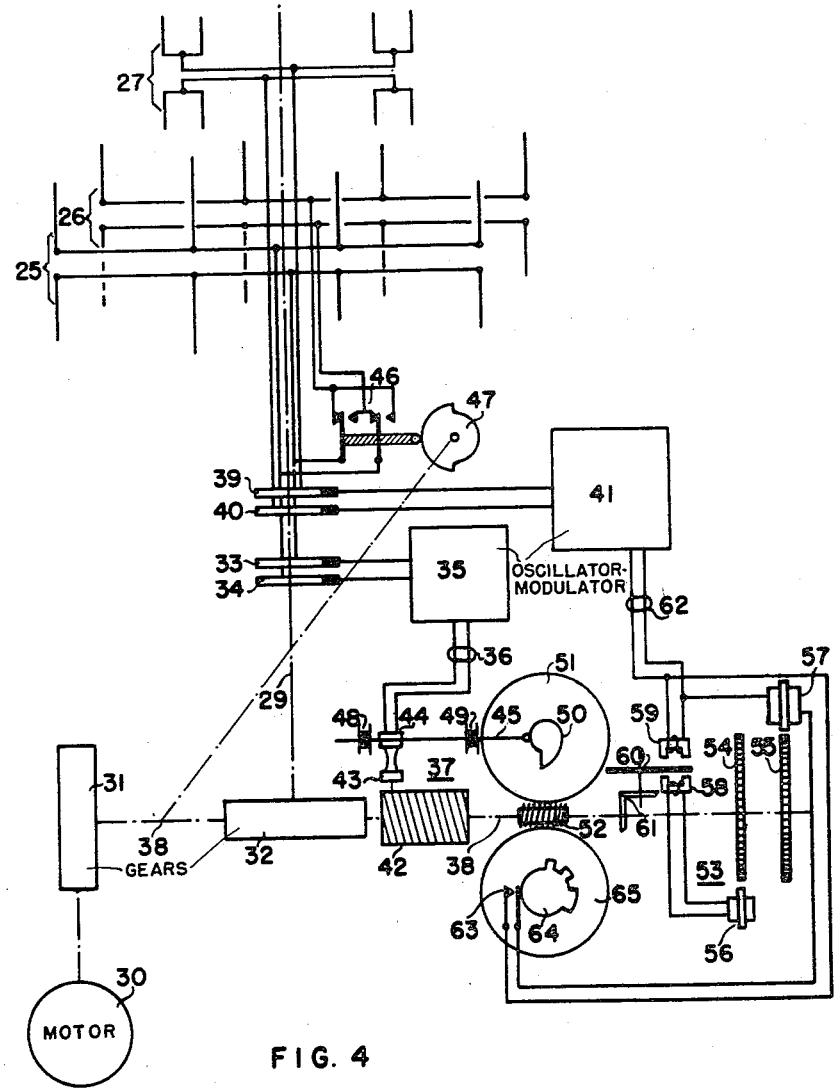
Fig. 4 shows schematically, partly in block diagram, one form of the invention, the function of which is to some extent represented by the preceding figures.

*Description of Fig. 4 radio beacon and explanation of operation thereof*

Fig. 4 shows a form of practicing the invention. One antenna array 25 in this form comprises a series of dipole antennas of the type, usually called "broadside antenna." Each dipole antenna of unit 25 has in the usual way one branch directed upwards and one branch directed downwards, each of said branches having an extension of one quarter of a wave length. A number of such dipole antennas, for example four, are employed in a horizontal level in parallel extension and at mutual distances of one half of a wave length. In a parallel level at a distance of a quarter of a wave length a similarly shaped group of dipole antennas of an array 26 is provided. The antenna system just described has for its purpose to transmit the bearing indications.

In addition to this antenna there is, however, suitably immediately above it, a further antenna system 27 provided. This may be of any suitable kind, which is capable of transmitting a field of figure-eight-like characteristic, but it is especially suiable to use a dipole antenna system of a particular kind. This consists of four dipole antenna units, each of them consisting of one branch directed upwards and one branch directed downwards. The dipole antenna units are combined by two and two and are separated by one eighth of a wave length's distance from each other. The distance between the centre lines of each of the so formed groups is three quarters of a wave length. Such an antenna is known to transmit a field with a flattened figure-eight-like diagram, which will therefore during the major part of the turn closely approach a circle, as represented in Fig. 3.

All of these antennas are mounted on a shaft 29, which is arranged to rotate with a constant speed equal to the number of turns, desired for the field rotation. This speed is obtained by the number of turns of the motor 30 being geared down in two steps by means of worm wheel gearings 31 and 32, respectively.

The antennas 25 and 26 are fed over feeder lines, which follow the shaft 29, and over two contact or slip rings 33, 34, applied concentrically on the shaft 29, said contact rings being connected to an oscillator-modulator 35, the tone frequency of which is, over the conductor 36, fed from a tone mechanism 37. The tone mechanism 37 contains a drum 42, applied on the shaft 38 extending between the worm wheel gearing 31 and the worm wheel gearing 32. This shaft is assumed to pass through the worm wheel gearing 32 and to drive that part of the apparatus, which is situated at the right of this worm wheel gearing. The drum 42 carries a layer of tightly wound magnetophonic wire and the sound pick-up 43 moves over this wire and is coupled to the oscillator-modulator 35 by the conductors 36. The movement of the sound pick-up 43 is obtained by said pick-up resting on a bushing 44, which is attached to the bar 45, which is in its turn slidably mounted in bearings 48 and 49, respectively. At one end the bar 45 carries a roller or cam follower which rests against a cam disc 50 that is rigidly mounted on a worm wheel 51 which in turn is driven by a screw or worm 52 secured to the shaft 38.

The magnetophonic wire of the drum 42 is the carrier of the magnetic sound registration, representing the bearing indications. There is, however, some difficulty in producing this sound registration, but it has proved that this can easily be produced in the following way:

The sound is recorded at a reduced speed on the drum, for instance this drum may be driven with half of its normal speed, and the bass is strongly accentuated. When the drum is thereafter driven at its normal speed, the accentuated bass will emphasize the sound in such a way that it will still afford a natural impression during the reproduction of the sound at that normal speed, which speed is double the speed. Clear, understandable speech then results. In this way the recorded time which is consumed for speaking may be kept very short.

A cam 47 operated from the driving system associated with the motor 30 controls a switch 46 which determines whether the forward lobe 10 or the contra lobe 11 of Fig. 1 is to be developed.

For avoiding disturbances, such as ground noise and similar disturbances from the sound drum, it is suitable to let the sound pick-up move over the sound with a greater pitch than the pitch of the wire. Of course, the sound head of the sound pick-up 43 must have a greater width than the thickness of two wires, in order that the distance between the bridged wires shall not create disturbing sound.

The antenna 27 is fed in a manner similar to that in which the antennas 25 and 26 are fed. Thus, the antenna 27 is coupled to contact or slip rings 39 and 40 which in turn are connected to an oscillator-modulator 41, which is in its turn fed by audio frequency from a tone mechanism 53. The tone mechanism 53 is also driven by the shaft 38. Its tone creating means consist in two tooth wheel generators 54 and 55 for essentially different frequencies. Each tooth wheel has a sound pick-up 56 and 57, respectively.

The sound pick-up 56 is connected to a transformer of specific kind, represented by two yokes 58 and 59 and a disc 60 rotating between the yokes. The disc 60 is kept in rotation by means of a bevelled gear 61, by means of which the disc 60 is driven about the shaft 38. The disc 60 may preferably be made of steel with deep teeth and tooth openings. Consequently, the disc 60 will short-circuit the field from the primary side 58 of the transformer so that no tone frequency from the tooth wheel generator 54-56 is transferred to the secondary side 59 when a tooth is placed in the level of the paper, that is between the yoke 58 of the primary side and the yoke 59 of the secondary side. However when a moment later a tooth opening will be placed between these yokes, the tone frequency from the generator 54-56 is then transferred over the primary side 58 and the secondary side 59 in the transformer to the oscillator-modulator 41 and will consequently be transmitted from the antenna system 27. In this way one will obtain a pulsating tone, which may either fully disappear from its full sound intensity or be essentially reduced in intensity. The mean sensibility of the ear will then be set for a rather low sensibility, which, due to the sensibility of the ear following the law of Weber, will be substantially under the arithmetical mean sound intensity due to the radiation from the antenna system 27.

It is especially advantageous that the rotation of the disc 60 is synchronized with the rotation of the drum 42 in such a way, that the disc 60 provides the transmission of a field with full sound intensity from the antenna system 27 simultaneously with a bearing indication being transmitted from one of the antenna systems 25 or 26, whereas the silent period from the antenna system 27 coincides with the silent period from the antenna system 25 and 26. The advantage of this arrangement will be evident from the following:

With the forms of the direction lobes of the different antenna systems shown in Fig. 3, obviously no covering signal will disturb the reception of the desired field from the antenna system 26 or the antenna system 25, that is a field received with reference to the direction lobes 10 or 11, respectively. By comparison between Fig. 2 and Fig. 3 it is, however, evident that about simultaneously with the direction lobe 10 transmitting the bearing indication "two," the directional lobe 11 will transmit first the bearing indication "nineteen" and shortly thereafter the bearing indication "twenty-one." There may now possibly be some kind of topographical formation, giving rise to a reflection, in the direction from the radio transmitter, on to which the field lobe 11 is turned, when the bearing on to the receiver is 20°, that means the bearing indication is represented by "two." This reflected wave will then also radiate in the direction of the lobe 10 and may possibly be received by the receiver, where it would be able to cause confusion. However, it is also evident from the diagram according to Fig. 2, that when the bearing indication "nineteen" is transmitted by the field lobe 11, all of the diagram has turned 10° relative to the bearing between the transmitter and the receiver, and that the receiver has consequently got into such a relation to either of the field lobes 23 and 24, that one will obtain a covering signal, modulated by the frequency represented by the tooth wheel generator 54—56. This covering signal will then drown the possibly reflected erroneous signal "nineteen" or "twenty-one," respectively.

The tooth wheel generator 55—57, which is coupled in parallel to the conductor 62, leading to the oscillator-modulator 41, is intended to create a tone of an essentially different tone amplitude than that of the tooth wheel generator 54—56, and this latter tone will be used for transmitting an identity signal. For this purpose the conductor from the tooth wheel generator 55—57 is carried over a contact 63, influenced by a cam disc 64, which is driven by means of the worm wheel 65 by the screw 52.

It is important that the worm wheels 51 and 65 should have different diameters so that a displacement will emanate between them during the rotation. In this way one precludes the identity signal from being transmitted at the same position or instant during each rotation of the antenna systems. In the direction in which the identity signal is transmitted, there will of course be no possibility of receiving the bearing indication.

The advantage of transmitting the covering signal according to the present invention by means of a pulsating or continuous radio frequency field, which is in any case modulated by audio frequency in the form of a pulsating modulation, is manifold. Firstly, the automatic setting of the ear for different attention will be improved, so that even a weak bearing indication can be understood in spite of the strong sound intensity of the covering signal. Secondly, it will be possible to synchronize the signal pulses of the covering signal with the bearing indications in such a way that one effectively prevents the listener at the receiver from hearing other bearing signals than those which are correct on his behalf.

Of course, the invention is not limited to the form of execution shown in the drawings and described above, but different modifications may be made within the frame of the invention.

What is claimed is:

1. A radio beacon comprising: a radiating system having a first radiation pattern of the shape of a sharply concentrated beam and a second radiation pattern of the general shape of a figure eight disposed with its axis normal to the axis of said beam; driving means coupled to said system for simultaneously rotating said patterns; a circuit for supplying a first carrier-frequency wave signal intermittently modulated by audio-frequency bearing information at predetermined angles of rotation of said first pattern; a circuit for supplying a second carrier-frequency wave signal intermittently modulated by an audio-frequency signal coincident with said intermittent modulation of said first wave signal; and means coupled to said circuits for applying said wave signals to said radiating system.

2. A radio beacon comprising: a radiating system having a first radiation pattern of the shape of a sharply concentrated beam and a second radiation pattern of the general shape of a figure eight disposed with its axis normal to the axis of said beam; driving means coupled to said system for simultaneously rotating said patterns; a circuit including an audio-frequency bearing-information reproducing system synchronously operated by said driving means for supplying a first carrier-frequency wave signal intermittently modulated by audio-frequency bearing information; a circuit for continuously supplying during said rotation of said patterns a second carrier-frequency wave signal intermittently modulated by an audio-frequency signal coincident with said modulation of said first wave signal; and means coupled to said circuits for applying said wave signals to said radiating system.

3. A radio beacon comprising: a radiating system having a first radiation pattern of the shape of a sharply concentrated beam and a second radiation pattern of the general shape of a figure eight disposed with its axis normal to the axis of said beam; driving means coupled to said system for simultaneously rotating said patterns; a circuit for supplying a first carrier-frequency wave signal intermittently modulated by audio-frequency bearing information at predetermined angles of rotation of said first pattern; a circuit for supplying a second carrier-frequency wave signal having the same mean frequency as said first wave signal and intermittently modulated by an audio-frequency signal coincident with said modulation of said first wave signal; and means coupled to said circuits for applying said wave signals to said radiating system.

4. A radio beacon comprising: a radiating system having a first radiation pattern of the shape of a sharply concentrated beam and a second radiation pattern of the general shape of a figure eight disposed with its axis normal to the axis of said beam; driving means coupled to said system for simultaneously rotating said patterns; a circuit for supplying a first carrier-frequency wave signal intermittently modulated by audio-frequency bearing information at predetermined angles of rotation of said first pattern; a circuit for supplying a second carrier-frequency wave signal modulated by a 400-cycle pulsating tone signal coincident with said modulation of said first wave signal; and means coupled to said circuits for applying said wave signals to said radiating system.

5. A radio beacon comprising: a radiating system having a first radiation pattern of the shape of a sharply concentrated beam and a second radiation pattern of the general shape of a figure eight disposed with its axis normal to the axis of said beam; driving means coupled to said system for simultaneously rotating said patterns at a constant speed; a circuit for supplying a first carrier-frequency wave signal intermittently modulated by audio-frequency bearing information driving means coupled to said system for simultaneously rotating said patterns; a circuit for supplying a second carrier-frequency wave signal intermittently modulated by an audio-frequency signal coincident with said modulation of said first wave signal; and means coupled to said circuits for applying said wave signals to said radiating system.

6. A radio beacon comprising: a radiating system having a first radiation pattern of the shape of a sharply concentrated beam and a second radiation pattern of the general shape of a figure eight disposed with its axis normal to the axis of said beam; driving means coupled to said system for simultaneously rotating said patterns; a circuit for supplying a first carrier-frequency wave signal intermittently modulated by audio-frequency bearing information at predetermined angles of rotation of said first pattern; a circuit for supplying a second carrier-frequency wave signal intermittently modulated by an audio-frequency signal coincident with said modulation of said first wave signal; and means coupled to said circuits for applying said wave signals to said radiating system.

7. A radio beacon comprising: a radiating system including first and second antenna systems having a first radiation pattern of the shape of a pair of sharply concentrated beams with a common axis and pointing in opposite directions and including a third antenna system having a second radiation pattern of the general shape of a figure eight disposed with its axis normal to the axis of said beams; driving means coupled to said system for simultaneously rotating said patterns; a circuit for supplying a first carrier-frequency wave signal intermittently modulated by audio-frequency bearing information at predetermined angles of rotation of said first and second patterns; a circuit for supplying a second carrier-frequency wave signal intermittently modulated by an audio-frequency signal coincident with said modulation of said first wave signal; and means coupled to said circuits for applying said first modulated wave signal alternately to said first and second antenna systems and for applying said second modulated wave signal to said third antenna system.

8. A radio beacon comprising: a radiating system having a first radiation pattern of the shape of a sharply concentrated beam and a second radiation pattern of the general shape of a figure eight disposed with its axis normal to the axis of said beam; driving means coupled to said system for simultaneously rotating said patterns; a circuit for supplying a first carrier-frequency wave signal intermittently modulated by audio-frequency bearing information at predetermined angles of rotation of said first pattern; a circuit including a toothed wheel generator for supplying a second carrier-frequency wave signal intermittently modulated by an audio-frequency signal from said generator coincident with said modulation of said first wave signal; and means coupled to said circuits for applying said wave signals to said radiating system.

9. A radio beacon comprising: a radiating system having a first radiation pattern of the shape of a sharply concentrated beam and a second radiation pattern of the general shape of a figure eight disposed with its axis normal to the axis of said beam; driving means coupled to said system for simultaneously rotating said patterns; a circuit for supplying a first carrier-frequency wave signal intermittently modulated by audio-frequency bearing information at predetermined angles of rotation of said first pattern; a circuit for supplying a second carrier-frequency wave signal; a toothed wheel generator for supplying a tone signal; a signal-translating channel between said generator and said last-mentioned supply circuit including a transformer having an air gap and a signal-interrupting means including a magnetically permeable toothed wheel rotatable in said gap for periodically interrupting the translation of said tone signal coincident with the interruption of said modulation of said first wave signal; and means coupled to said circuits for applying said wave signals to said radiating system.

10. A radio beacon comprising: a radiating system having a first radiation pattern of the shape of a sharply concentrated beam and a second radiation pattern of the general shape of a figure eight disposed with its axis normal to the axis of said beam; driving means coupled to said system for simultaneously rotating said patterns; a circuit for supplying a first carrier-frequency wave signal intermittently modulated by audio-frequency bearing information at predetermined angles of rotation of said first pattern; a circuit for supplying a second carrier-frequency wave signal intermittently modulated by an audio-frequency tone signal coincident with said modulation of said first wave signal and intermittently modulated by an audio-frequency identification signal having the same frequency as and an amplitude greater than that of said tone signal; and means coupled to said circuits for applying said wave signals to said radiating system; said intermittent modulation of said second wave signal by said identification signal having an asynchronous relation to said intermittent modulation of said first and second carrier-frequency wave signals.

References Cited in the file of this patent

UNITED STATES PATENTS

| | | |
|---|---|---|
| 2,212,238 | Kolster | Aug. 20, 1940 |
| 2,279,031 | Cockerell et al. | Apr. 7, 1942 |
| 2,424,079 | Dome | July 15, 1947 |
| 2,444,439 | Grieg et al. | July 6, 1948 |
| 2,450,005 | Labin et al. | Sept. 28, 1948 |
| 2,462,853 | Frum | Mar. 1, 1949 |
| 2,609,534 | Taylor | Sept. 2, 1952 |